United States Patent [19]
Klink et al.

[11] Patent Number: 5,215,347
[45] Date of Patent: Jun. 1, 1993

[54] SCREW-RETAINED MOTOR-VEHICLE SEAT UNIT

[75] Inventors: Josef Klink, Nagold; Bernd Schmidt, Gechingen; H. J. Schlaffke, Saulgau; Volker Speck, Sindelfingen; Emil Dinkel, Renningen; Burckhard Becker; Ernst-Reiner Frohnhaus, both of Solingen; Heinz-Jürgen Wagener, Remscheid, all of Fed. Rep. of Germany

[73] Assignee: Mercedes-Benz AG, Fed. Rep. of Germany

[21] Appl. No.: 774,981

[22] Filed: Oct. 15, 1991

[30] Foreign Application Priority Data
Oct. 15, 1990 [DE] Fed. Rep. of Germany ....... 4032676

[51] Int. Cl.⁵ .............................................. B60N 2/00
[52] U.S. Cl. ..................................... 296/63; 296/65.1
[58] Field of Search ................... 296/63, 65.1; 297/344

[56] References Cited
U.S. PATENT DOCUMENTS

| | | | |
|---|---|---|---|
| 4,094,489 | 6/1978 | Yoshimura | 297/344 X |
| 4,492,408 | 1/1985 | Lohr | 297/344 |
| 4,666,209 | 5/1987 | Kazaoka et al. | 297/344 |
| 4,811,925 | 3/1989 | Fujita et al. | 296/65.1 X |

FOREIGN PATENT DOCUMENTS

| | | |
|---|---|---|
| 2916562 | 10/1980 | Fed. Rep. of Germany . |
| 178935 | 11/1982 | Japan .................................. 296/65.1 |
| 12347 | 1/1985 | Japan .................................. 296/65.1 |
| 145245 | 6/1989 | Japan .................................. 296/63 |
| 2113538 | 8/1983 | United Kingdom . |

Primary Examiner—David M. Mitchell
Assistant Examiner—Gary C. Hoge
Attorney, Agent, or Firm—Eveson, McKeown, Edwards & Lenahan

[57] ABSTRACT

A seat unit can be screwed automatically to the body platform at four fixing points without the need to alter the seat setting during screwing and has a sufficiently rigid connection, in particular a sufficiently firm connection for seat belts which are fixed to the seat, to the body platform. The fixing regions are provided in the floor rail itself, in particular in each case at a distance from the free ends of the latter and in a profile region, extending essentially parallel to the body platform, of the floor rail. These regions are joined directly to a steep wall and, with the latter, in each case form a ramp, and are oriented such that they enclose as small an angle as possible with the floor rail, although this angle is kept sufficiently large that, in an installation setting of the seat unit, the axes of the holes extend in front of the front side of the seat and behind the rear side of the seat with a clearance of a few centimeters, which makes possible the use of a screwdriver unit.

24 Claims, 3 Drawing Sheets

SCREW-RETAINED MOTOR-VEHICLE SEAT UNIT

BACKGROUND AND SUMMARY OF THE INVENTION

The present invention relates to a motor-vehicle seat unit and, more particularly, to a seat unit which has a seat and two rail pairs for the longitudinal adjustment of the seat. Each rail pair is made up of a seat rail and a floor rail, and fixing regions which extend downwards such that they face away from one another and have a hole for a fixing screw to effect a screwed connection of the seat unit to the body platform of the motor vehicle at the end regions of the floor rails.

A known seat unit is shown in UK Patent Specification No. 2,113,538. It describes a seat unit with two rail pairs of different design. At both ends, the floor rail of each rail pair has in each case a fixing region in which the hole for the screw-fastening of the respective rail end is provided. The fixing region is situated on an additional part which is produced separately from the floor rail and is connected to the latter in a suitable manner, for example by welding. For the rear region of a floor rail, the fixing region extends virtually at right angles to the direction of displacement, whereas, for the front ends of the floor rails, the fixing regions are different, namely, on one hand extending obliquely forwards and downwards at an angle of about 45 degrees and, on the other hand, extending in a manner offset in parallel to the plane of the displacement of the seat.

The fixing regions make automatic screwing in of the seat unit possible, at least in part. Completely automatic installation is, however, not achieved with the solutions already known. Furthermore, these known solutions have the decisive disadvantage that the floor rails are not connected directly to the body platform of the motor vehicle but with the interposition of the additional parts which project outwards at the ends of the respective floor rail and have a lower rigidity than the floor rail itself. The quality of the fixing of the floor rail to the body platform of the motor vehicle then depends decisively on the design of the respective additional parts and, in particular, on their connection to the floor rail. In the case of the known seat unit, an advantageous mutual reinforcement of the floor rail and of the immediately adjacent subregion of the body platform is not achieved. Problems with respect to tear-out strength also arise in the case of seat belts which are fixed to the seat.

The foregoing is the starting point of the present invention which has an object of improving the seat unit such that, on one hand, it can be screwed automatically to the body platform at all four fixing points without the need to alter the seat setting during screwing and, on the other hand, has a sufficiently rigid connection, in particular a sufficiently firm connection for seat belts which are fixed to the seat, to the body platform.

This object has been achieved, starting from the known seat unit, by the fact that the fixing regions (a) are provided in the floor rail itself, in particular in each case at a distance from the free ends of the latter and in a profile region, extending essentially parallel to the body platform, of the floor rail, (b) are joined directly to a steep wall and, with the latter, in each case form a ramp, and (c) are oriented such that they enclose as small an angle as possible with the floor rail, although this angle is sufficiently large that, in an installation setting of the seat unit, the axes of the holes extend in front of the front side of the seat and behind the rear side of the seat with a clearance of a few centimeters, which makes possible the use of a screwdriver unit.

The seat unit of the present invention thus achieves a very firm connection of the floor rails to the body platform. The high rigidity of floor rails of tear-out-resistant longitudinal guides, which is essentially achieved by vertical profile regions extending essentially at right angles to the body platform, is brought into the fixing region and is not lost, as was the case in the prior art, due to the additional parts. Furthermore, the fixing regions do not extend the total length of the floor-rail units. On the contrary, the floor rail retains the length which is required for sufficient engagement with the seat rail over the entire displacement path.

The present invention makes possible completely automatic installation of the seat in all four fixing points at the end regions of the floor rail. The installation time for a seat unit is thereby markedly reduced. This reduction is not at the expense of the quality of the connection between floor rail and body platform. The quality of connection achieved is indeed the same as that in the case of currently predominant techniques for fixing floor rails on the body platform, namely screwing the floor rail directly to the body platform.

In a side view, i.e. transversely to the direction of displacement, the fixing region of the present invention, together with the steep wall, has the form of a sawtooth projecting upwards or downwards from the profile region of the floor rail. The fixing region extends essentially parallel to the body platform. The hole is as near as possible to the transition between the undisturbed bottom profile region and the fixing region. The fixing region itself is configured to be as short as possible, as seen in the direction of displacement, and its length is determined essentially by the head diameter of the fixing screw utilized. The steep wall is likewise as short as possible, preferably extending parallel to the direction of the axis of the hole. It is preferably shorter than the fixing region, again as seen in the displacement direction.

In the fixing regions, the body platform is of corresponding configuration, i.e. has comparable slopes preferably provided in crossmembers or supports which project upwards from the floor panel. By virtue of the oblique position at the front and at the rear of the body platform components or fixing regions, the seat unit is aligned and centered during installation. During their installation on the floor panel of the body platform, which is generally effected by spot-welding, the crossmembers or supports of the body platform, in which there are internal threads aligned with the holes of the fixing regions, are guided by a template in order to make possible precise association with the floor rails. The internal threads are formed by weld nuts, insert nuts or the like.

In an advantageous further embodiment, the fixing regions are formed in a cup-shaped part which, as seen from the hole in the fixing region, is connected all the way around to the bottom profile region of the floor rail, either integrally or by a suitable connection, e.g. welding. With the cup-shaped design, the fixing region is stiffened even further and is better connected to the bottom profile region of the floor rail. In this way, the rigidity of the floor rail is even more favorably exploited in the connection region and imparted to the body platform.

The fixing region is part of the bottom profile of the floor rail and/or part of a separate insert. In a currently preferred embodiment, a recess is provided in the floor rail and extends essentially in a U-shaped form, leaving a tab which is bent downwards or upwards, and forms part of the fixing region. In addition, an insert is provided, likewise forming a fixing region, but also forms the steep wall and is connected to the bottom profile of the floor rail at least in front of and to the rear of the hole as seen in the displacement direction. This insert is preferably cup-shaped.

The rails can be manufactured from steel, aluminum or some other suitable material. Rail profiles which are highly suitable for carrying out the invention are shown, for example, in German Patent No. 3,143,431 and German Offenlegungsschrift No. 2,545,763. In these longitudinal guides, the respective floor rail has a bottom profile region which permits the formation of the fixing region according to the present invention.

BRIEF DESCRIPTION OF THE DRAWINGS

These and further objects, advantages and features of the present invention emerge more fully from the following detailed description of currently preferred embodiments of the present invention, which are to be understood as merely illustrative, when taken in conjunction with the accompanying drawings wherein.

DETAILED DESCRIPTION OF THE DRAWINGS

Figure 1:
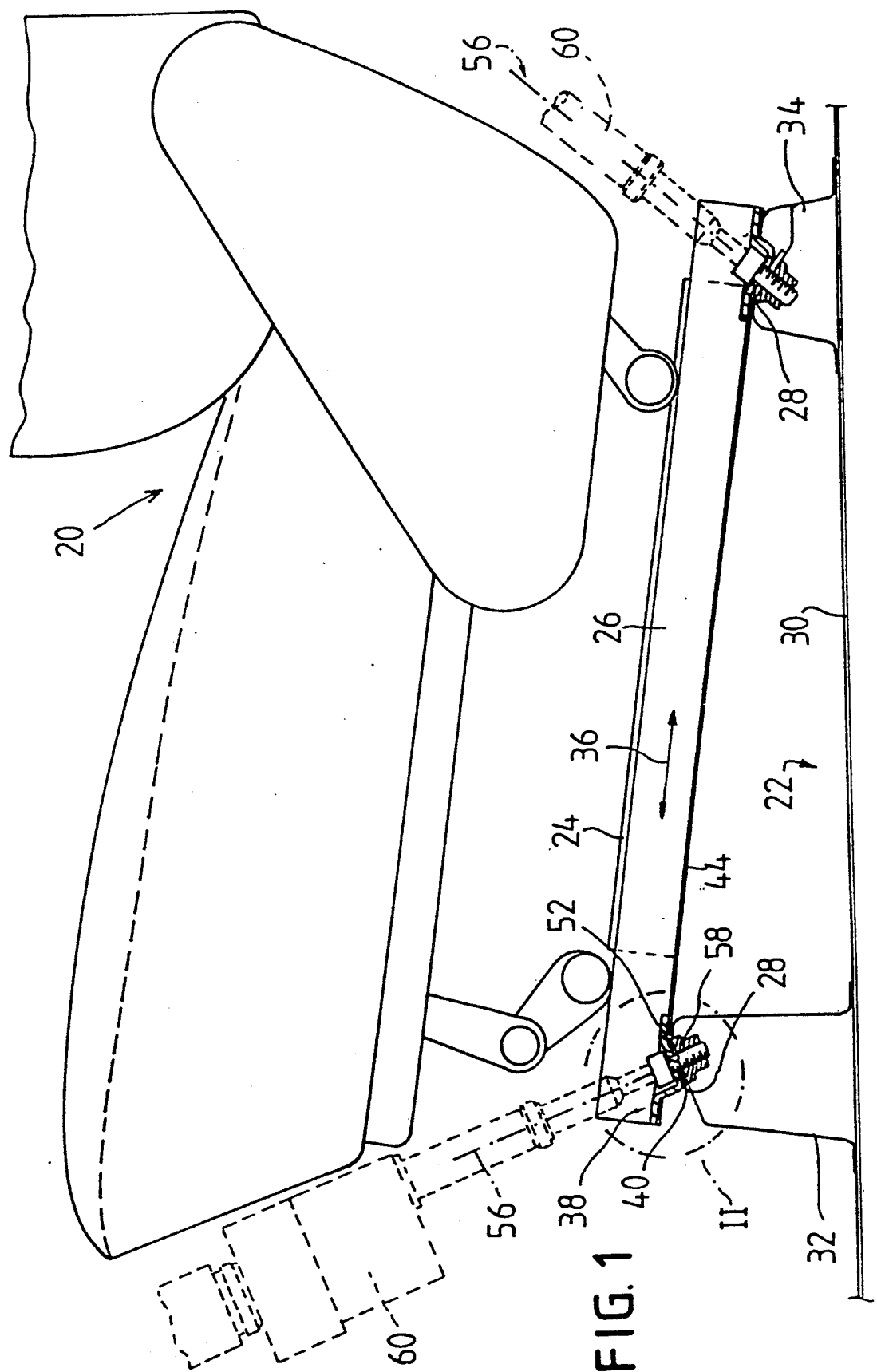
FIG. 1 is a side elevational view of a seat unit according to the present invention sectioned in the region of the longitudinal guide and the floor assembly.

As can be seen in FIG. 1, the seat unit includes a seat 20 (shown in part) with a seat cushion and a backrest, the tilt of the backrest being adjustable, a height and tilt adjustment (not shown in greater detail) for the seat 20 and two rail pairs for fixing and longitudinal adjustment of the seat on a body platform designated generally by numeral 22. Each of the two rail pairs essentially comprises, in a known manner, a seat rail 24 connected to the seat 20 and a floor rail 26 connected to the body platform 22. Since rail pairs of this kind are known per se, they are, therefore, not explained in greater detail.

Fixing regions 28 are provided in the two end regions of each floor rail 26. These regions are particularly clearly shown in enlarged FIGS. 2-5 and serve for the screw-fastening of the floor rail 26 to the body platform 22. The body platform 22 in the particular embodiments shown comprises a floor panel 30 and, welded on to the panel 30, pedestal-shaped individual supports 32 at the front, below the front edge of the seat, and a transversely extending crossmember 34 below the rear edge of the seat.

Figure 2:
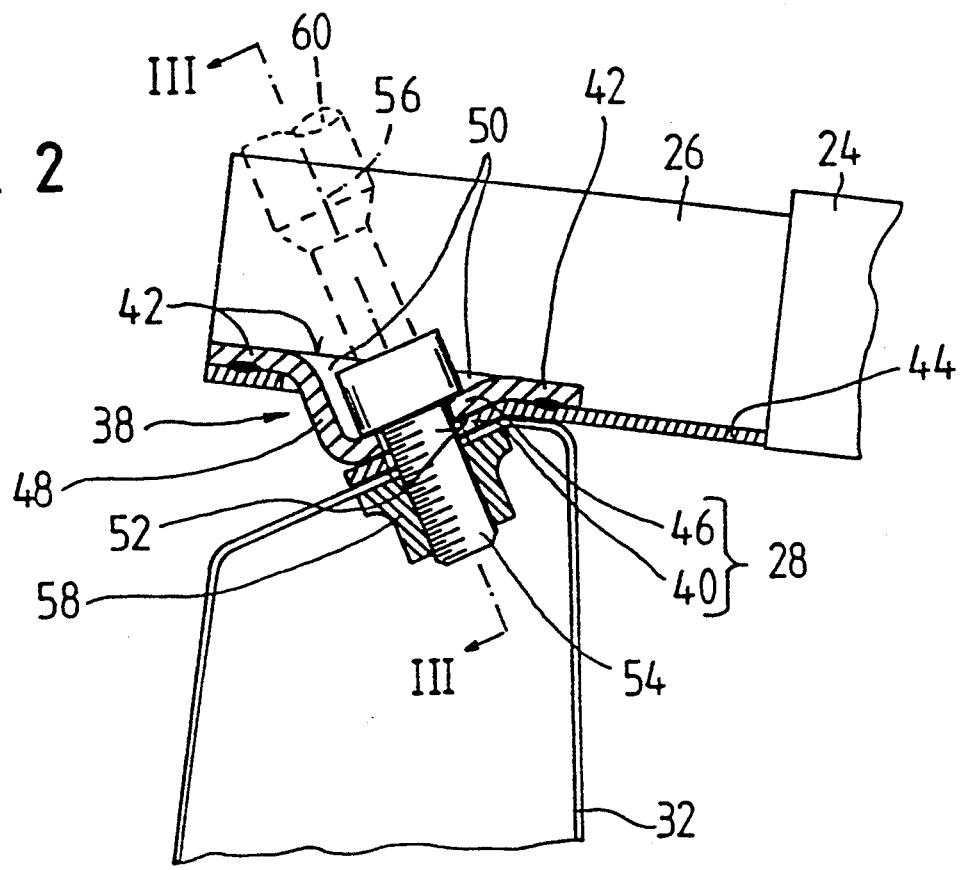
FIG. 2 is an isolated enlarged view of the detail II shown in the dot-dash circle in FIG. 1.
Figure 3:
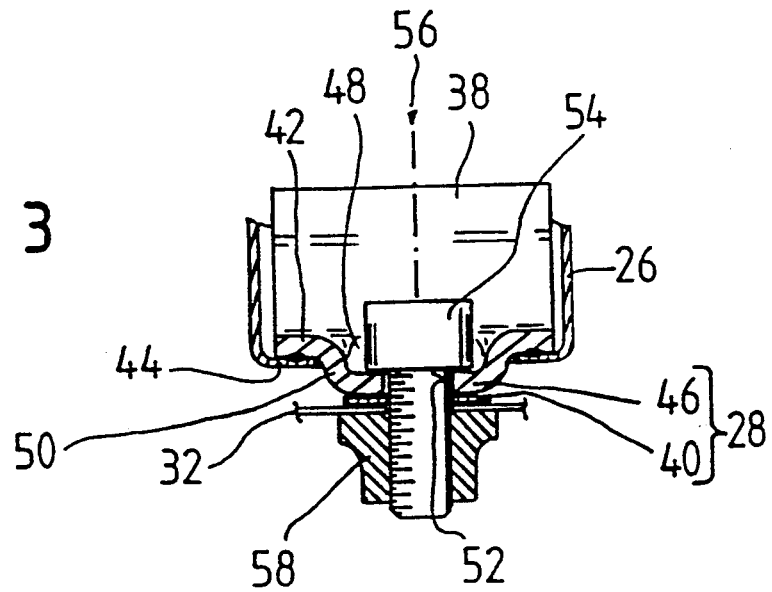
FIG. 3 is a sectional view along line III—III in FIG. 2.

The fixing regions 28 are essentially flat pieces of sheet metal which extend at an oblique angle to the longitudinal displacement direction 36 shown by the double arrow in FIG. 1. In the embodiment of FIGS. 1-3, the front fixing region 28 of both floor rails 26 extends obliquely forward at an angle of about 30 degrees sloping downwards, and the rear fixing region 28 likewise extends at an angle of 30 degrees, but obliquely rearwards and with a downward slope. These details relate to longitudinal displacement direction 36. With the floor panel 30, the longitudinal displacement direction 36 in turn encloses an angle of about 8 degrees, as FIG. 1 shows, and the rails 24, 26 extend rearwards at this angle.

In the embodiment according to FIGS. 1-3, the total of four fixing regions 28 of the two floor rails 26 are each configured in an identically constructed manner by part of an insert 38 and a tab 40. The insert 38 is cup-shaped and has a rim 42 running round on all sides and lying in one plane. The insert 38 is connected at the rim 42 to that profile region 44 of the floor rail which extends in the plane of displacement (the plane of the two directions of displacement of the two longitudinal guides), for example by spot-welding. An oblique wall 46 projects from this plane at the stated angle of 30 degrees, in each case downwards, and merges integrally into a steep wall 48. The two walls 46, 48 together have a sawtooth or ramp shape as viewed in FIG. 2. Side walls 50 provide a lateral border as seen in FIG. 3. A hole 52 is provided in the oblique wall 46 for a fixing screw 54, with the numeral 56 denoting the axis of the hole 52.

The second part of the fixing region 28, i.e. the tab 40, is part of the bottom profile region 44. For this purpose, an essentially U-shaped punching is provided in this profile region 44, with the open region of this U-shaped punching pointing towards the middle of the rail. The tabs 40 obtained in the punching process are bent downwards by the stated angle and extend parallel to and below the oblique wall 46. There is also a hole 52 in each of the tabs 40.

As all the figures illustrate, the shape of the supports 32 and of the crossmember 34 is matched in the upper region to the oblique shape of the fixing regions 28. Accordingly, the two supports 32 for each vehicle seat have an upper wall extending obliquely forwards and downwards, and the crossmember 34 likewise has formed portions with a corresponding wall shape. Holes are also provided in the supports 32 and in the crossmember 34. These holes coincide as exactly as possible with the holes 52 in the installed condition as seen in FIG. 1. Below each hole is a weld nut 58. The fixing screw 54 is screwed into it, as again can be seen in FIGS. 1-5.

During the installation of the seat unit, the floor rails 26 are placed on the oblique walls of the supports 32 and of the crossmember 34, with the oblique walls of the supports 32 sloping upwards to a point in a manner similar to a gable roof. In this condition, the seat can be adjusted. As it is screwed down, it is in addition pulled onto the supports 32 and the crossmember 34, so that an adaptation takes place during the screw-down process.

The fixing regions 28 are situated within the shape of the floor rail 26. Between each fixing region 28 and the associated free end of the floor rail 26, there is an undisturbed part of the bottom profile region 44. As can be seen, for example, from FIGS. 1 and 2, the rim 42 engages over it, and the rim ends flush with the free end.

The angle of inclination of the fixing regions 28 obliquely forwards and downwards and obliquely rearwards and downwards, respectively, is chosen so that, in a setting position of the seat unit, the axes 56 of the holes 52 extend in such a way that there remains just enough space at the front and rear for four screwdriver units 60. By means of the units 60, the fixing screws 54 are delivered, inserted into the holes 52 and screwed to the nuts 58. As FIG. 1 shows, the axes 56 of the holes at the front extend virtually parallel to the front edge of the seat and at a distance of a few centimeters from the latter, and the axes 56 of the holes at the rear likewise extend obliquely behind the rear surface of the seat and at a distance of a few centimeters from the latter. The inclination of the fixing regions 28 is chosen so that there is no significant (i.e. excessively large) clearance between the screwdriver units 60 and the respective ends of the seat.

This foregoing description permits automatic installation of the seat unit on the body platform 22, but only pertains for a certain setting of the seat. The longitudinal setting is in a particular predetermined displacement position and is locked, and the height setting is set to the highest position, as is a tilt setting. If required, the tilt setting of the backrest is also predetermined. This position of all the setting possibilities of the seat unit is referred to as the delivery or installation position. Automatic installation by screwing in as described need not necessarily be possible in the case of other settings of the seat unit.

Figure 4:
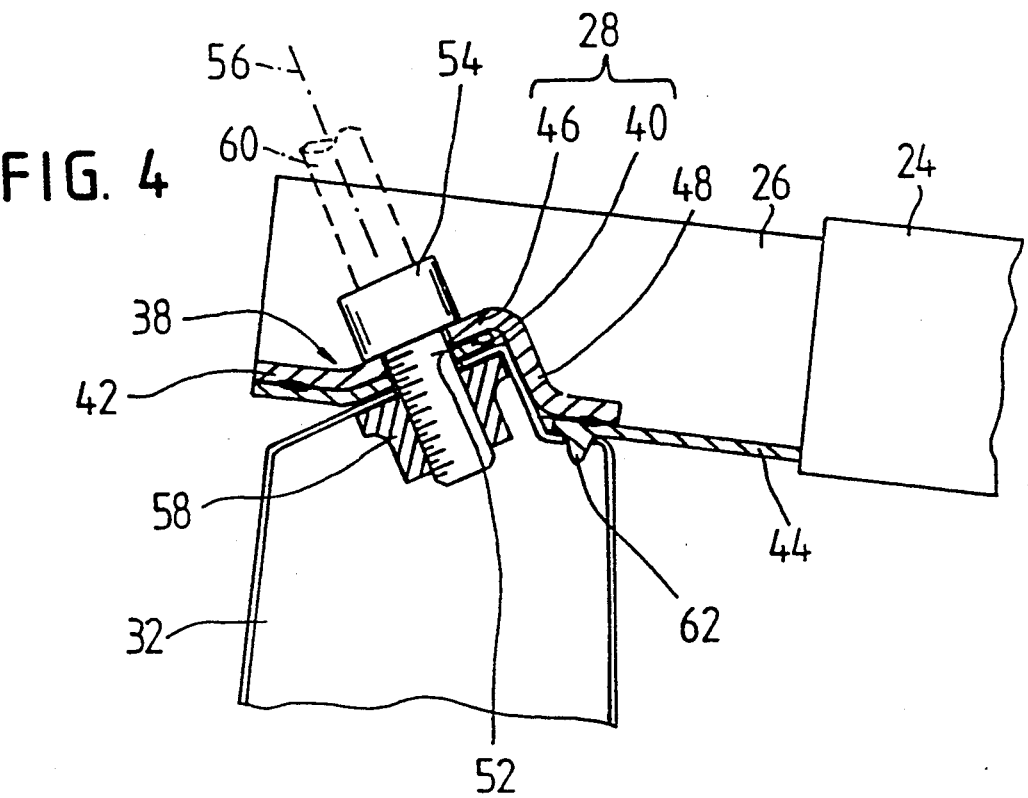
FIG. 4 is a view, similar to FIG. 2, but of a modified embodiment.

In the embodiment according to FIGS. 1-3, the fixing regions 28 extend downwards out of the profile region 44 of the floor rail 26. In the embodiment of FIG. 4, however, they are situated above this profile region 44. Here, the steep wall 48 is no longer near to the free end of the rail as in FIGS. 1-3; instead, the steep wall 48 is situated on one side of the fixing region 28, while the undisturbed end of the rail 26 is situated on the other side of the fixing region A further difference of the embodiment shown in FIG. 4 from the embodiment of FIGS. 1-3 is that the insert 38 does not have any side walls 50. It is produced from a rectangular piece of sheet metal by bending it three times about mutually parallel bending axes, thus not having an encircling rim 42, and is therefore connected to the bottom profile region 44 only in front of and behind the fixing screw 54 as seen in the displacement direction 36.

FIG. 4 also shows a centering projection 62 which projects downwards from the bottom profile region 44 and engages in a locating opening of a similarly inclined upper wall of the supports 32 and of the crossmember 34. The projection 62 is of conical design and has a rounded portion at the front. When the seat unit is placed onto the body platform 22, the four centering projections 62 engage in the associated locating openings and bring about an alignment of the seat unit relative to the body platform 22. The use of the screwdriver units 60 is thereby simplified.

In another embodiment within the scope of the present invention, the inward or outward curvature of the profile region 44, the curvature being formed by a fixing region 28 and the steep wall 48 or a steep-wall piece 49, is itself used as the centering projection. The supports 32 and the crossmember 34 have correspondingly formed hollows or convex stamped formations into which the inward or outward curvatures find their way when the seat unit is inserted. Otherwise, the conditions pertaining in the embodiment according to FIG. 4 correspond to those in the embodiment described above. The fixing region 28 is likewise in each case formed by an oblique wall 46 of the insert 38 and at the same time, by a tab 40, which is an integral part of the bottom profile region 44.

In the embodiment seen in FIG. 4, however, the U-shaped cut is effected such that the opening of the U-shape faces the free end of the rail. In the region of the screw fastening, the supports 32 and the crossmembers 34 are matched to the shape of oblique wall 46 and steep wall 48 and, if required, of the bottom profile region 44. In all embodiments, however, an upper wall region of the body platform 22 is configured to run parallel to the fixing regions 28.

Figure 5:
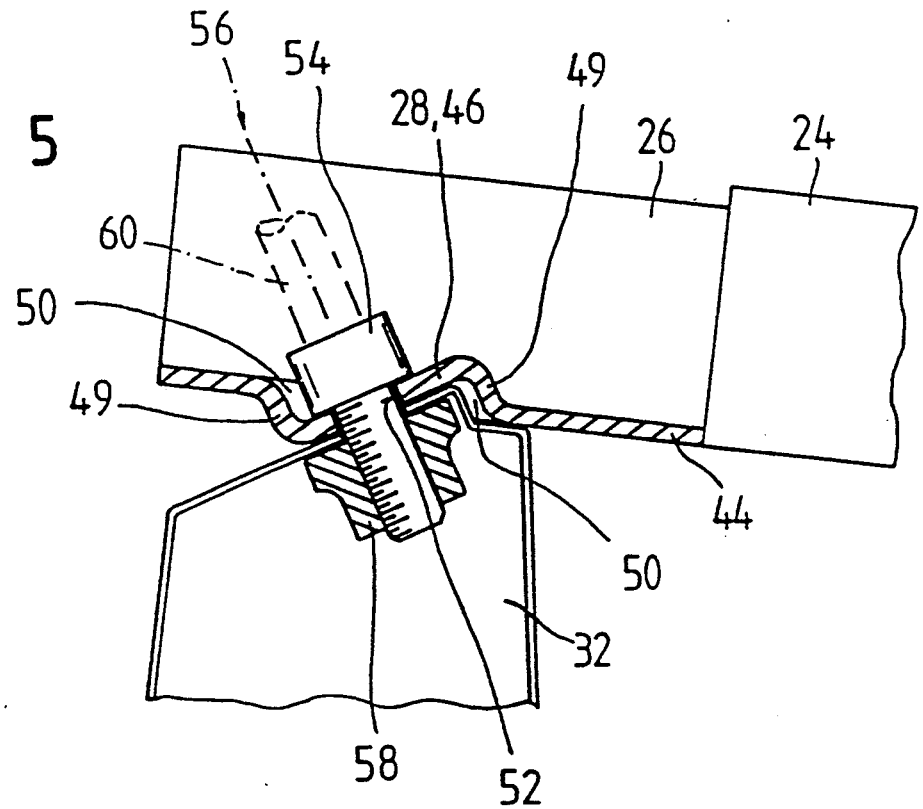
FIG. 5 is a view again similar to FIG. 2, of yet another embodiment of the present invention.

The embodiment according to FIG. 5 represents an exception insofar as no additional insert 38 is provided. The fixing region 28 is produced by deforming the bottom profile region 44. In order to keep this deformation as small as possible, the steep wall 48 is divided into two partial wall pieces 49, one of which is in front and the other behind the fixing region 28 in the longitudinal displacement direction 36, with the two pieces being of essentially the same length. Side walls 50 are also provided, the stamped formation thus having a double cup shape. This embodiment is suitable, for example, for bottom rails 26 made of steel but, given a suitable procedure, aluminum rails can also be used.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor-vehicle seat unit, comprising a seat, two rail pairs for the longitudinal adjustment of the seat, each rail pair comprising: a seat rail and a floor rail, a plurality of fixing regions extending downwards so as to face away from one another and having a hole for a fixing screw to provide a screwed connection of the seat unit to a motor vehicle body platform at end regions of the floor rails, wherein the fixing regions are provided in the floor rail at a distance from free ends of the floor rail the free ends being in a plane of the floor rail, and each of the fixing regions comprising at least one steep wall and forming a ramp oriented to enclose as small an angle as possible with the floor rail, while maintaining the angle sufficiently large so that, in an installation setting of the seat unit, axes of the holes extend in front of the front seat of the seat and behind the rear side of the seat with a clearance of a few centimeters to permit the use of a screwdriver unit.

2. The seat unit according to claim 1, wherein, the fixing regions are formed at least partially by an oblique wall of an insert.

3. The seat unit according to claim 1, wherein, the fixing regions are formed at least partially by an inclined part of a bottom profile region of the floor rail.

4. The seat unit according to claim 3, wherein, the fixing regions are formed at least partially by an oblique wall of an insert.

5. The seat unit according to claim 3, wherein, the fixing regions are formed at least partially by a tab consisting of material of a bottom profile region and are bent relative to the undisturbed bottom profile region.

6. The seat unit according to claim 3, wherein, the fixing regions are formed at least partially from a deformed part of a bottom profile region.

7. The seat unit according to claim 1, wherein, each of the fixing regions are connected at each end of a bottom profile region.

8. The seat unit according to claim 7, wherein, the fixing regions are formed at least partially by an oblique wall of an insert.

9. The seat unit according to claim 8, wherein, the fixing regions are formed at least partially by an inclined part of a bottom profile region of the floor rail.

10. The seat unit according to claim 9, wherein, the fixing regions are formed at least partially by a tab consisting of material of a bottom profile region and are bent relative to the profile region.

11. The seat unit according to claim 8, wherein, the fixing regions are formed at least partially from a deformed part of a bottom profile region.

12. The seat unit according to claim 1, wherein, the fixing regions are connected at least partially to side walls to a lateral regions of the bottom profile region.

13. The seat unit according to claim 12, wherein, the fixing regions are formed at least partially by an oblique wall of an insert.

14. The seat unit according to claim 13, wherein, the fixing regions are formed at least partially by an inclined part of a bottom profile region of the floor rail.

15. The seat unit according to claim 14, wherein, the fixing regions are formed at least partially by a tab consisting of material of a bottom profile region and are bent relative to the undisturbed bottom profile region.

16. The seat unit according to claim 1, wherein, each of the fixing regions are connected at each end of a bottom profile region.

17. The combination of the seat unit according to claim 1 and a motor vehicle body platform, wherein, the body platform comprises an upper boundary wall extending obliquely in a manner corresponding at least to the shape of the fixing region and matched to at least one of a shape of a bottom profile region and to a steep wall of the fixing region.

18. The seat unit according to claim 17, wherein, the fixing regions are formed at least partially by a tab consisting of material of a bottom profile region and are bent relative to the undisturbed bottom profile region.

19. The seat unit according to claim 1, wherein, a connection region between the floor rails and the body platform has a centering projection for centering, wherein a curvature is formed by the fixing regions and the steep wall of the fixing region which corresponds to a curvature formed in the body platform.

20. The combination of the seat unit according to claim 19 and a motor vehicle body platform, wherein, the body platform comprises an upper boundary wall extending obliquely in a manner corresponding at least to a shape of a fixing region and matched to at least one of the shape of the bottom profile region and to a steep wall of the fixing region.

21. The seat unit according to claim 1, wherein the fixing regions are provided in a guiding area of the floor rail at a distance from free ends of the guiding area, wherein the guiding rear is the region of the floor rail in which the seat rail slides.

22. The seat unit according to claim 3, wherein the bottom profile region is a bottom-side guiding area, wherein the guiding area is the region of the floor rail in which the seat rail slides.

23. The seat unit according to claim 6, wherein the bottom profile region is a bottom-side guiding area, wherein the guiding area is the region of the floor rail in which the seat rail slides.

24. The seat unit according to claim 12, wherein the bottom profile region is a bottom-side guiding area which permits undisturbed shifting, wherein the guiding area is the region of the floor rail in which the seat rail slides.

* * * * *